Patented July 29, 1952

2,605,188

UNITED STATES PATENT OFFICE 2,605,188

PLANT JUICE CONCENTRATES

George L. Baker, Newark, Del., assignor to Haskell Research Foundation, Newark, Del., a corporation of Delaware No Drawing. Application January 27, 1951,
Serial No. 208,247

18 Claims. (Cl. 99—205)

This invention relates to novel plant juice concentrates and particularly to frozen fruit and vegetable juices.

Great strides have been made in recent years in the preparation and marketing of frozen fresh fruit and vegetable juices. The freshly expressed juice from the particular plant, such as orange juice, grapefruit juice, tomato juice, prune juice, apple juice and the like, is usually first concentrated, that is a portion of the water is removed, taking care to avoid destruction of the vitamin content and of the fresh taste and appearance of the material. The soluble solids content is thereby increased, ordinarily to within the range of 40 to 60% by weight. This concentrated juice is then frozen, especially by the relatively new quick- or deep-freezing methods, and the frozen concentrate marketed. The public buys the frozen product, allows it to thaw or melt, and dilutes it to three or four times its original volume with water, thus reconstituting the previously removed water content and providing a beverage. Such a beverage is more similar to fresh juice as squeezed from the plant than any previously available product. The usual commercial processes for making frozen juice concentrates of this type are those developed by the National Research Corporation, the Vacuum Foods Corporation and the Florida Citrus Commission. They are more fully described by Burton in Food Industries, 19, 617 (1947).

An entirely different type of fruit or vegetable product, which has been well known for years, is the gels or jellied desserts and salads, commonly known as "gelatins" although many gelling agents other than gelatin are frequently employed therein. These "gelatin" desserts, salads and aspics are marketed usually as powders, which the housewife mixes with water, boils and cools to effect solidification. Obviously the fruit or vegetable flavoring in such powders cannot be similar in taste to, and certainly not nearly so nutritious as, the original fresh plants, because of the extensive dehydration and other processing which it must undergo. Manufacturers of these products are constantly seeking means for rendering them more flavorful and nutritious.

It is an object of this invention to provide new frozen plant juice concentrates. A further object is to provide such novel concentrates which are at the same time capable of reconstitution to produce beverages and of gelling to form jellied desserts and salads having substantially the flavor and nutritional value of the freshly expressed plant juice. Other objects will become more apparent from a study of the ensuing description.

The above objects are realized by my novel compositions of matter which broadly comprise a frozen plant juice concentrate and a gelling agent selected from the group consisting of gelose extracted from Irish moss and low-methoxyl pectins. I have discovered that these two specific types of gelling agents are substantially unaffected by freezing; no other common agent with which I have experimented resists swelling in the juice concentrates and is capable of such continued effectiveness after subjection to the low temperatures and drastic physical conditions found in commercial quick- or deep-freezing processes. This unusual characteristic of Irish moss gelose and low-methoxyl pectins has led me to term them "latent" gelling agents, in contradistinction to the conventional gelling agents, and I shall employ this term herein. It is a peculiar property of these latent gelling agents that they will not disperse or swell upon customary reconstitution of the juice concentrate by simple thawing and dilution with water, but are only dispersed therein by heating. Consequently, my novel compositions may be simply diluted with water in the usual manner and utilized as beverages, or the same materials may be diluted with water, heated and cooled to form gels or jellies for use in salads, desserts and the like. Further, the undiluted concentrates may be heated and cooled to produce more strongly flavored jellied foods. There is thus provided for the first time a foodstuff which can be stored indefinitely and then used as either a beverage or a jelly, without any additional treatment whatsoever, and which will retain in either use flavor and nutritional characteristics very similar to a freshly squeezed or expressed plant juice product.

The new process whereby my novel compositions are prepared comprises incorporating one of the aforementioned latent gelling agents, activated by a suitable metallic salt, in a plant juice concentrate and then freezing the concentrate. As previously discussed, fruit and vegetable juices are usually dewatered in commercial operations to achieve at least about 40%, and generally between 40 and 60% by weight soluble solids content, and it is with these concentrates that I prefer to deal. It is best to concentrate the fresh juice first and then add the latent gelling agent thereto before freezing. However, in many instances the temperature of concentration processing is low enough, i. e. rarely above 100° F., so that the agent can be added to the raw juice and the mixture then concentrated and frozen. Alternatively, the concentrate may be partially frozen, as is often done to avoid separation of a water core, then treated with my gelling agent, and finally packaged and completely frozen. The addition of my agents does not affect the customary processing techniques for frozen juices.

The Irish moss (*Chondrus crispus*) gelose substances, popularly known as carragheen extractives and described by Alexander in "Colloid Chemistry," vol. VI (1946), page 629, are generally flavorless and colorless when refined, so that they do not alter the taste of the juices. For satisfactory gelation of my compositions, these gelose extractives must be activated by a metal salt, as previously mentioned. For this purpose potassium salts, particularly the simple, edible potassium organic or inorganic acid salts, are used. The potassium ion has a vital and distinctive effect on the efficacy and speed of solidification, forming complexes with the gelose extractives. It also further decreases dispersibility of the extractives in the cold concentrates and reconstituted beverages. Some commercially available agents of this gelose type also contain locust bean gum, which has been found to have a synergistic effect upon gelation. The Irish moss-derived compounds are preferred for use in my process and products and are most efficient; however, as before indicated, low-methoxyl pectin agents are also operable and useful. They are generally described in U. S. Patents Nos. 2,233,547 and 2,358,430; "low-methoxyl" may be defined as indicating a maximum of about 7% methoxyl groups. Such pectins are especially effective in the presence of added calcium ions. Complexes of calcium and pectin, such as calcium pectinate, are apparently formed, and the plant juice itself usually provides any needed buffer salt. In lieu of calcium one may add essentially any other common polyvalent metal cation, e. g. magnesium; however, considerations of cost, toxicity, gelling efficiency, etc. cause calcium to be much preferred. I have found that it is only necessary to incorporate substantially between 0.5 and 5% by weight of the latent gelling agent, either the Irish moss gelose or pectin type, in the juice concentrate, in order to obtain satisfactory products for either beverage or jelly uses. Generally a proportion of 3% by weight is sufficient; when this concentrate is then diluted, as is customary, with three times its original volume of water and gelled, the solidified product contains about 0.75% by weight of the agent.

As previously noted, these latent gelling agents have substantially no deleterious effect on the characteristics of the juice concentrate. The frozen material may simply be melted and diluted as usual to provide a beverage. The agents often seem to add richness to the appearance of such reconstituted beverages, and tend to stabilize them. The same product is now enabled to serve two purposes. These particular latent gelling agents are dispersed throughout the mass by simple heating, by dilution with boiling water or by dilution with cold water and then boiling; when they have been so dispersed, cooling effects gelation. It is noteworthy that the agents will not disperse in the cold or room temperature concentrate, but readily disperse upon heating, especially in the diluted product which may contain only 10% to 14% solids. Such addition of gelling agents is directly contrary to the thinking of frozen juice processors today; they envision only beverages and have been, in fact, consistently fighting the possibility of gelation of their products during processing or storage. My novel compositions will not gel during processing or storage, but will gel by simple dilution and heating at the moment desired by the housewife.

The following examples are provided simply to illustrate this invention and not in any way to limit its scope:

*Example I*

Orange juice, grape juice and apple juice concentrates, each analyzing about 50% soluble solids, were treated with 1% by weight of a commercial Irish moss gelose extractive containing added potassium salts. The treated concentrates were quick-frozen and then reconstituted by thawing and diluting with water to obtain soluble solids contents of 10%. The resulting beverages were not affected in viscosity, taste and general consumer appeal by the presence of the gelling agent.

The same three juice concentrates were treated with one gram of the same commercial Irish moss gelose extractive to 25 ml. of the concentrate and quick-frozen. The products were then thawed and mixed with 75 ml. of boiling water. These diluted mixtures were allowed to cool, whereupon each set to a firm gel.

Two other common gelling agents, agar and gelatin, were used to treat orange, apple and grape juice concentrates in exactly the same manner. It was found that neither one of these agents was suitable. Large particles of agar were noted in the reconstituted beverages, and the gelatin-treated concentrates were extremely thick.

*Example II*

Apple, grape and orange juice concentrates were treated with low (6%) methoxyl pectin produced from apple pomace in Nova Scotia. Four grams of the powdered pectin and 2 ml. of an 18.36% $CaCl_2 \cdot 2H_2O$ aqueous solution (0.2 gram Ca) were incorporated in 100 ml. samples of the concentrates. These mixtures were then subjected to deep-freezing and finally tested like the materials of Example I. The present products, too, were very suitable both for drinking and for gelling purposes.

The same types of juices were treated with other relative proportions of pectin and calcium salt, and it was found that best results were obtained with the quantities used above, i. e. 0.5 ml. of the 18.36% $CaCl_2 \cdot 2H_2O$ solution per gram of the pectin. One ml. of the salt solution per gram of pectin was also satisfactory, causing only slight coagulation of the reconstituted juices, but a 2 ml. per gram ratio was generally undesirable, causing coagulation.

*Example III*

The following plant juice concentrates were treated with Irish moss gelose extractives containing potassium salts: orange, apple, grape, coffee, lemon, prune, grapefruit and an orange-grapefruit mixture. Each of these treated concentrates was stored for 17 days at 0 to −5° F., following which it was reconstituted and tested as a beverage and jelly in the usual manner. All samples were found to be perfectly satisfactory for either use.

A sample of orange juice concentrate similarly treated was stored for six months under the same deep-freeze conditions and thereafter performed in the same successful manner.

As many apparently widely different embodiments of this invention may be made without departing from the spirit and scope thereof, it is to be understood that the above invention is not limited, except as defined in the appended claims.

I claim:

1. A composition of matter comprising a frozen plant juice concentrate and a gelling agent selected from the group consisting of Irish moss gelose extractives and low-methoxyl pectins.

2. A composition of matter comprising a frozen plant juice concentrate, Irish moss gelose extractive and a potassium salt.

3. A composition of matter comprising a frozen plant juice concentrate, low-methoxyl pectin and a polyvalent metal salt.

4. A composition of matter comprising frozen plant juice concentrated to between about 40% and 60% by weight of soluble solids and substantially from 0.5% to 5% by weight of a gelling agent selected from the group consisting of complexes of Irish moss gelose extractives with a potassium salt and complexes of low-methoxyl pectins with a calcium salt.

5. A process which comprises incorporating in a plant juice concentrate a gelling agent selected from the group consisting of potassium salt-activated Irish moss gelose extractives and polyvalent metal salt-activated low-methoxyl pectins, and then freezing the concentrate.

6. A process which comprises concentrating a freshly expressed plant juice, adding to the concentrate an Irish moss gelose extractive and a potassium salt, and quick-freezing the resulting mixture.

7. A process which comprises concentrating a freshly expressed plant juice, adding to the concentrate a low-methoxyl pectin and a calcium salt, and quick-freezing the resulting mixture.

8. A composition as claimed in claim 1 wherein the plant juice is a fruit juice.

9. A composition as claimed in claim 2 wherein the plant juice is a fresh fruit juice.

10. A composition as claimed in claim 3 wherein the plant juice is a fresh fruit juice.

11. A composition as claimed in claim 4 wherein the plant juice is orange juice.

12. A composition as claimed in claim 4 wherein the plant juice is grape juice.

13. A composition as claimed in claim 4 wherein the plant juice is apple juice.

14. A composition as claimed in claim 4 wherein the plant juice is grapefruit juice.

15. A process as claimed in claim 5 wherein the plant juice concentrate is obtained from freshly expressed fruit juice.

16. A process as claimed in claim 6 wherein the plant juice is orange juice.

17. A process as claimed in claim 7 wherein the plant juice is orange juice.

18. A process as claimed in claim 7 wherein the plant juice is orange juice and the calcium salt is calcium chloride.

GEORGE L. BAKER.

No references cited.